(12) United States Patent
LaGace

(10) Patent No.: US 8,641,189 B2
(45) Date of Patent: Feb. 4, 2014

(54) EYEWEAR WITH EXTENDABLE PROTECTIVE ELEMENT

(75) Inventor: Danielle LaGace, Shawnee, KS (US)

(73) Assignee: Bushnell, Inc., Overland Park, KS (US)

( * ) Notice: Subject to any disclaimer, the term of this patent is extended or adjusted under 35 U.S.C. 154(b) by 258 days.

(21) Appl. No.: 13/230,952

(22) Filed: Sep. 13, 2011

(65) Prior Publication Data

US 2013/0063696 A1     Mar. 14, 2013

(51) Int. Cl.
*G02C 5/20* (2006.01)
*G02C 5/00* (2006.01)
*G02C 5/14* (2006.01)

(52) U.S. Cl.
CPC ............. *G02C 5/006* (2013.01); *G02C 5/146* (2013.01)
USPC ................................. 351/118; 351/44; 351/63

(58) Field of Classification Search
CPC .................................. G02C 5/006; G02C 5/146
USPC ......... 351/41, 44, 47, 63, 111, 113–121, 158; 2/448, 449

See application file for complete search history.

(56) References Cited

U.S. PATENT DOCUMENTS

| | | | | |
|---|---|---|---|---|
| 4,105,304 A | * | 8/1978 | Baker | 351/47 |
| 5,048,943 A | * | 9/1991 | Allen | 351/50 |
| 7,547,101 B2 | * | 6/2009 | Fuziak, Jr. | 351/158 |

* cited by examiner

*Primary Examiner* — Huy K Mai
(74) *Attorney, Agent, or Firm* — Hovey Williams LLP

(57) ABSTRACT

Eyewear comprising a lens frame, at least one earpiece, and at least one extension element is disclosed. The extension element is moveable between a retracted position, wherein the element is partially or completely hidden behind the earpiece, and an extended position, wherein the element is positioned below the earpiece. The earpiece may include a recess for receiving the extension element in a nested relationship when the extension element is in the retracted position.

18 Claims, 5 Drawing Sheets

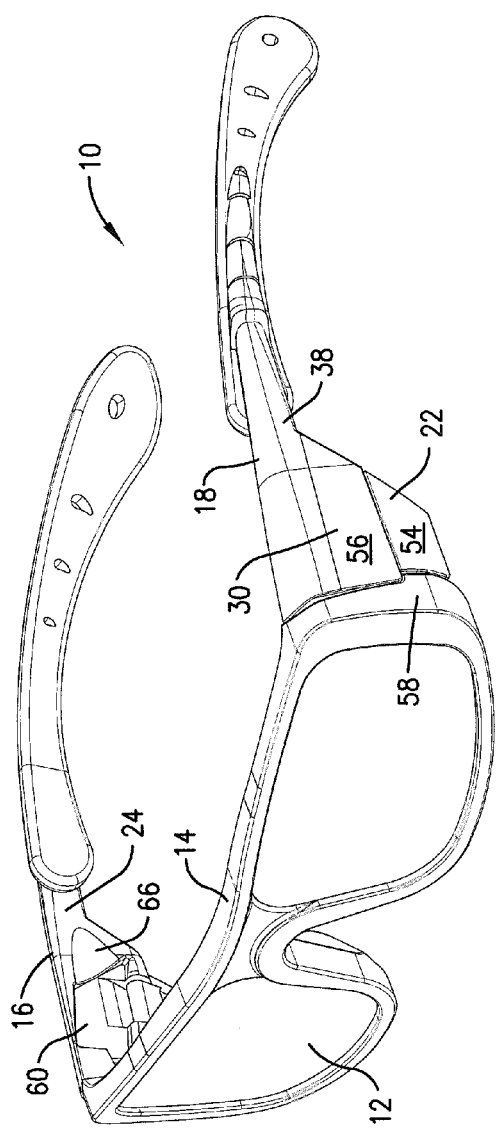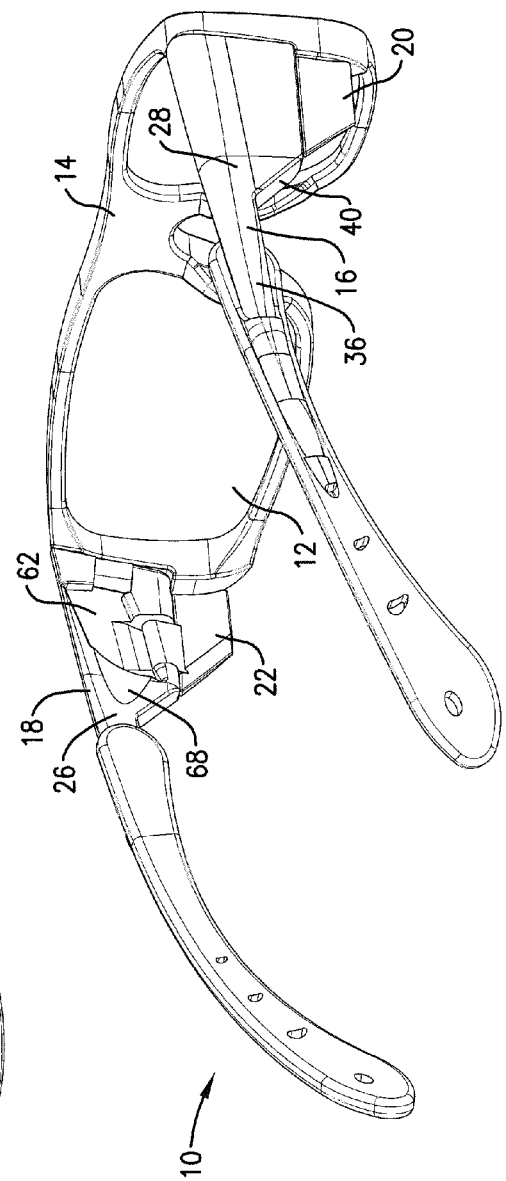

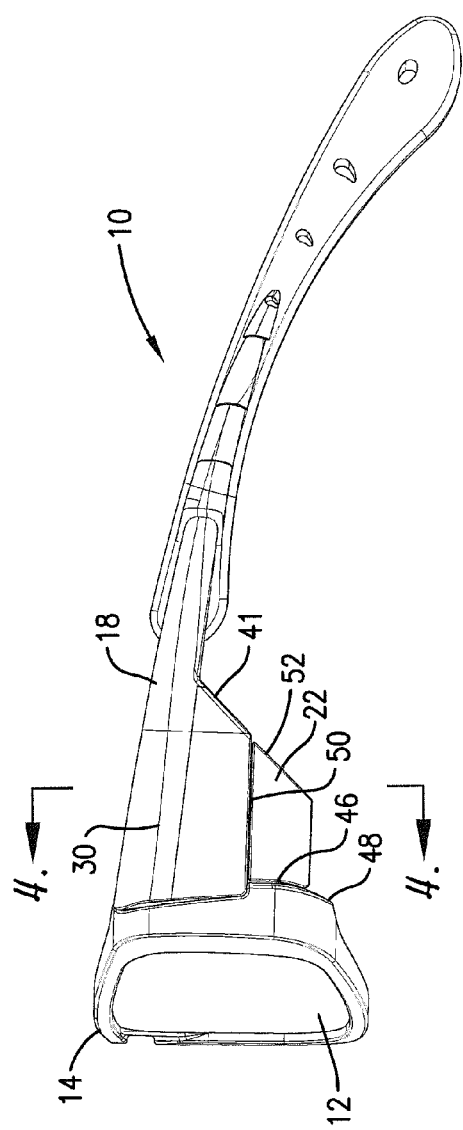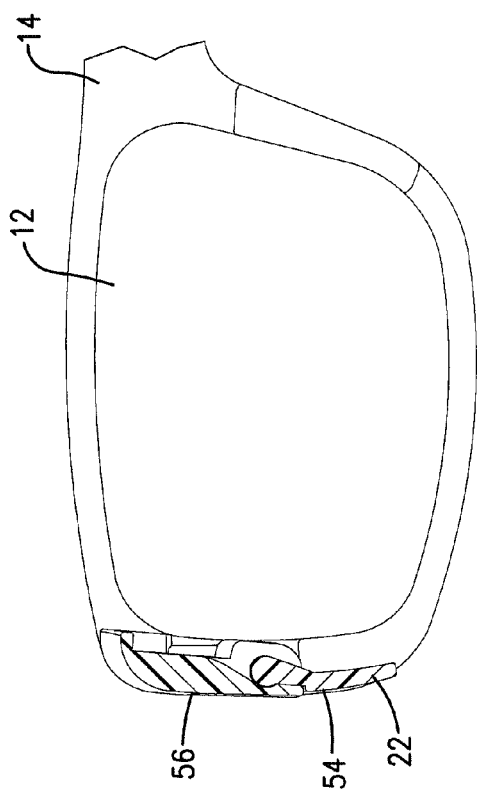

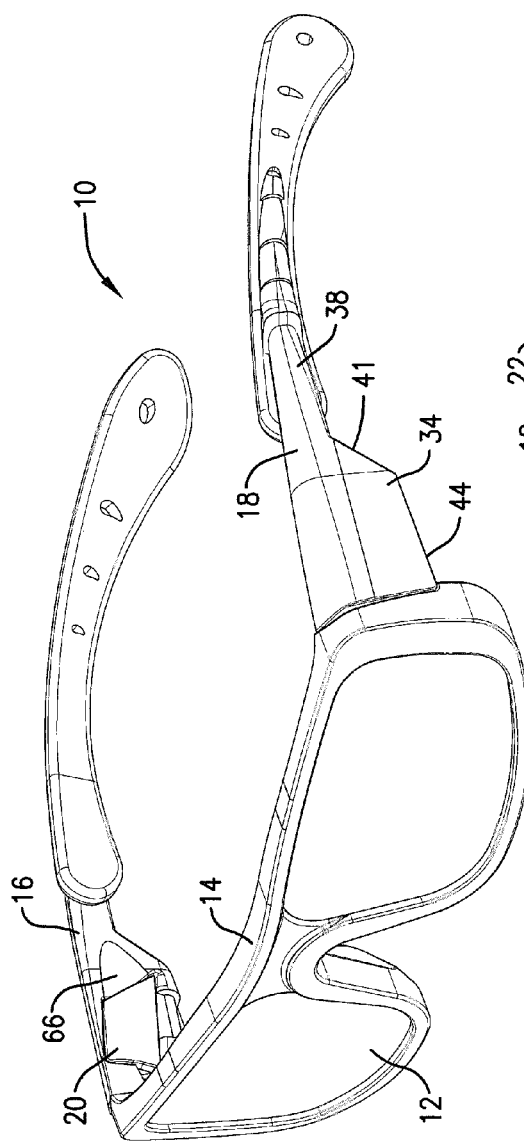
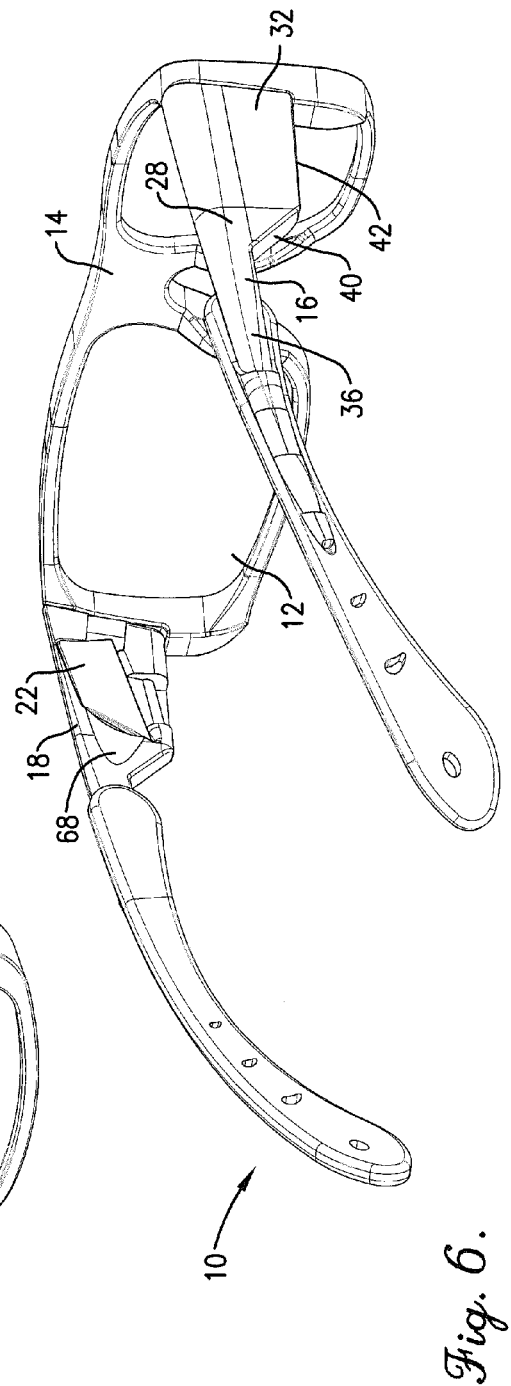

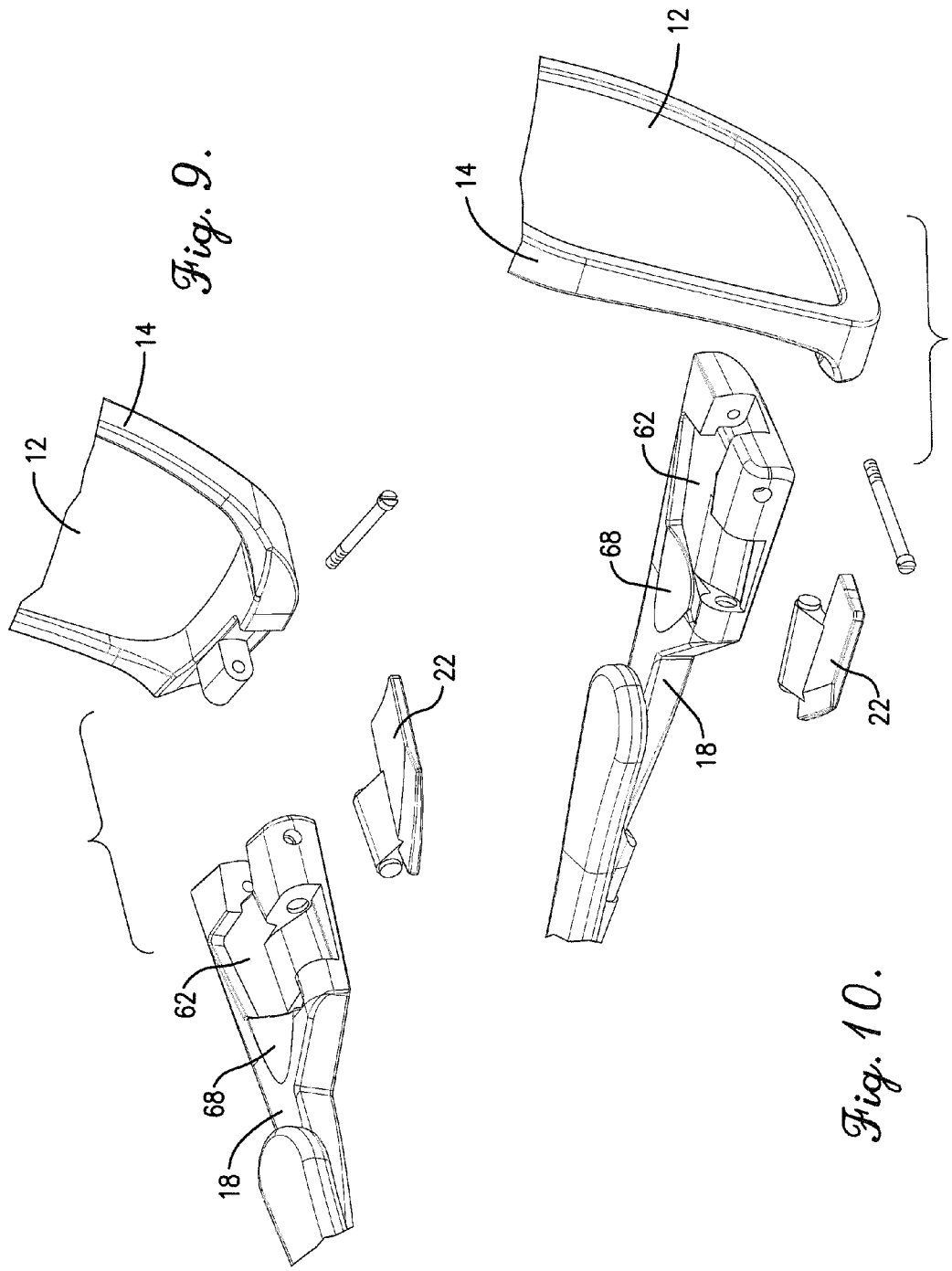

EYEWEAR WITH EXTENDABLE PROTECTIVE ELEMENT

BACKGROUND

1. Field

Embodiments of the present invention relate to sunglasses, prescription eyeglasses, and other eyewear. More particularly, embodiments of the invention relate to eyewear with one or more extendable elements moveable between a retracted position and an extended position for providing additional protection, changing the appearance of the eyewear, adding structural strength, and/or other purposes.

2. Related Art

Eyewear such as sunglasses or prescription glasses traditionally have two lenses, a lens frame to hold the lenses in place and to rest on a wearer's nose, and two earpieces or temples which rest on the wearer's ears and support the eyewear. Some eyewear also includes additional protective features, such as protective shielding positioned at the periphery of the lenses or lens frame to provide protection against light, dust or debris.

Unfortunately, existing eyewear shielding can be cumbersome and unsightly, and may not be necessary at all times when a user is wearing the eyewear. Accordingly, there is a need for eyewear that overcomes these limitations above.

SUMMARY

Eyewear constructed in accordance with a first embodiment of the invention may comprise a lens frame, an earpiece attached to the lens frame, and an extension element movably attached to the earpiece and movable between a first position and a second position.

Eyewear constructed in accordance with a first embodiment of the invention may comprise a lens frame and an earpiece attached to the lens frame, the earpiece including a recess. An extension element is pivotably attached to the earpiece and is pivotable between a retracted position and an extended position. When the extension element is in the retracted position, it is nested in the recess and is substantially flush with an inner surface of the earpiece. When the extension element is in the extended position, it is positioned at least partially below the earpiece and is substantially flush with an outer surface of the earpiece adjacent the extension element and with an outer surface of the lens frame adjacent the extension element when in the second position.

A method in accordance with a third embodiment of the invention may comprise moving an extension element of an earpiece from a retracted position wherein the extension element is substantially hidden, to an extended position wherein the extension element is positioned below the earpiece. The method further comprises moving the extension element from the extended position to the retracted position.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWINGS

Embodiments of the present invention are described in detail below with reference to the attached drawing figures, wherein:

FIG. 1 is a front perspective view of eyewear constructed according to an exemplary embodiment of the invention, demonstrating extension elements in an extended position;

FIG. 2 is a rear perspective view of the eyewear of FIG. 1;

FIG. 3 is a side elevation view of the eyewear of FIG. 1;

FIG. 4 is a fragmentary rear elevation view of the eyewear of FIG. 1;

FIG. 5 is a front perspective view of the eyewear of FIG. 1, illustrating the extension elements in a retracted position;

FIG. 6 is a rear perspective view of the eyewear of FIG. 5;

FIG. 9 is an exploded fragmentary view of a portion of the eyewear of FIG. 1; and FIG. 10 is an exploded fragmentary view of a portion of the eyewear of FIG. 1.

Figure 7:
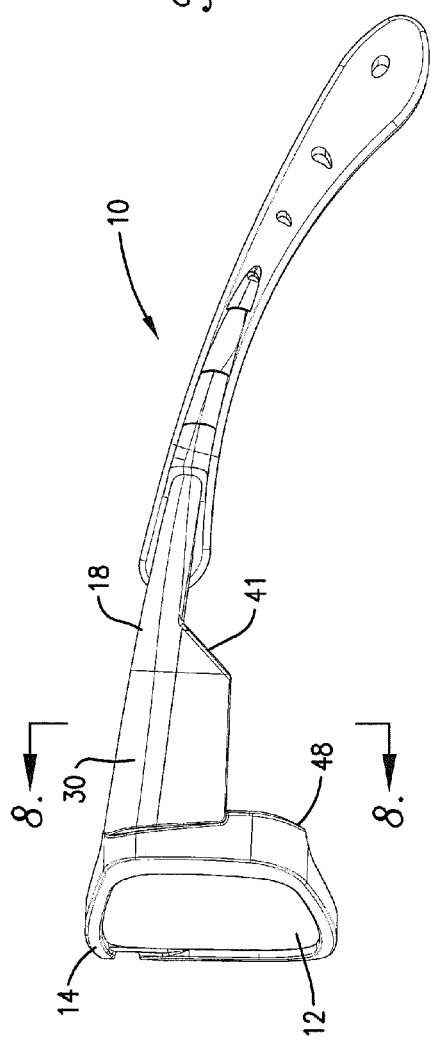
FIG. 7 is a side elevation view of the eyewear of FIG. 5.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention may be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 8:
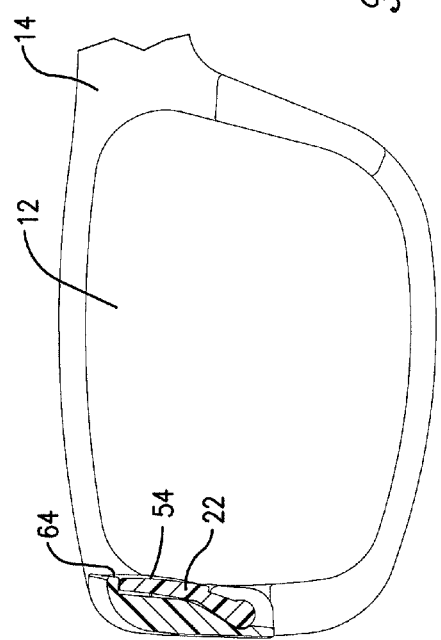
FIG. 8 is a fragmentary rear elevation view of the eyewear of FIG. 5.

Various embodiments of the invention, as illustrated in FIGS. 1-10, comprise eyewear 10, such as sunglasses or prescription eyeglasses. The eyewear 10 may comprise one or more lenses 12, a lens frame 14, one or more earpieces 16,18, and one or more extension elements 20,22. The earpieces 16,18 may each pivot relative to the lens frame 14 between a folded position and an unfolded position in a conventional manner. The extension elements 20,22 are moveable between a first, retracted position (illustrated in FIGS. 5-8) and a second, extended position (illustrated in FIGS. 1-4). When in the extended positioned, the extension elements 20,22 may serve to protect a wearer from light, air, dust or debris. The extension elements 20,22 may additionally or alternatively serve one or more other purposes, such as changing the appearance of the eyewear, strengthening the eyewear, and so forth.

The lenses 12 may be conventional and may be plastic, glass, and/or other at least partially transparent material which allows at least a portion of light to pass therethrough. The lens frame 14 may also be conventional in nature and may be sized and configured to secure the lenses 12 in fixed, spaced-apart relation with each other and with a user when the eyewear 10 is worn on a user's head. In some embodiments of the invention, at least a portion of the lens frame 14 may extend between the lenses 12 and provide a surface configured to rest on a user's nose.

The earpieces 16,18 may extend from opposing ends of the lens frame 14 to or past a person's ears when the lens frame is resting on the person's nose. The first and second earpieces 16,18 may be pivotally attached to opposing ends of the lens frame 14 such that the earpieces 16,18 may pivot between an unfolded position and a folded position in a conventional manner. The earpieces 16,18 may be elongated arms having inward-facing sides 24,26 and outward-facing sides 28,30. With particular reference to FIGS. 5 and 6, each earpiece 16,18 may include a wide portion 32,34, narrow portion 36,38, and a tapered edge 40,41 between the wide portion 32,34 and the narrow portion 36,38.

As used herein, the term "earpiece" means a portion of the eyewear 10 that supports or helps support the eyewear 10 by engaging a portion of a user's body. An earpiece may engage the user's ear, but may additionally or alternatively engage a side of the user's head proximate the ear, or other portion of the user's head.

In the illustrated embodiment, the extension elements 20,22 are pivotally attached to the inward-facing sides 24,26 of the earpieces 16,18 such that each extension element 20,22 is pivotable between a retracted position (illustrated in FIGS. 5-8) and an extended position (illustrated in FIGS. 1-4). The extension elements 20,22 may be pivotably attached to the earpieces 16,18 proximate lower edges 42,44 of the earpieces 16,18, such that the extension elements 20,22 pivot about the lower edges 42,44 and are positioned below the earpieces 16,18 when in the second position.

With particular reference to extension element 22 in FIG. 3, when the extension element 22 is in the second position a forward edge 46 of the extension element 22 may be substantially adjacent to a rim 48 of the lens frame 14, and an upper edge 50 may be substantially adjacent the lower edge 44 of the earpiece 18, thus providing a barrier against light, air, dust or other debris. Furthermore, the forward edge 46 of the extension element 22 may physically engage the rim 48 and the upper edge 50 of the extension element 22 may physically engage the earpiece 18, thus providing enhanced protection, structural strength, or both.

A trailing edge 52 of the extension element 22 may be in general alignment with an edge or a portion of an edge of the earpiece 18, such as the tapered edge 41. Furthermore, and as best illustrated in FIG. 1, an outer surface 54 of the extension element 22 may be partially or substantially flush with an outer surface 56 of the earpiece 18 that is proximate the extension element 22, and may be partially or substantially flush with an outer surface 58 of the lens frame 14 that is proximate the extension element 22. Such a configuration may be visually appealing by, for example, providing a smooth visual transition from the earpiece 18 to the extension element 22.

The earpieces 16,18 may include recesses 60,62 for receiving the extension elements 20,22 in a nested relationship when the extension elements 20,22 are in the retracted position. With reference to extension element 22 in FIG. 8, when the extension element 22 is in the retracted position and nested in the recess 62, the outer surface 54 of the extension element 22 is substantially flush with one or more proximate surfaces 64 of the earpiece 18. Earpiece 16 and extension element 20 present similar characteristics. While it is not essential to the present invention that the surfaces 54 and 64 (and corresponding surfaces on earpiece 16 and extension element 20) are flush when the extension elements 20,22 are in the first position, such a configuration may be desirable in certain embodiments to, for example, avoid unintended contact with the extension elements 20,22, enhance the appearance of the earpieces 16,18, or both.

When the extension elements 20,22 are in the retracted position, they are partially or completely hidden from external view. Indentations 66,68 may be included proximate the recesses 60,62 to facilitate access to the extension elements 20,22. For example, the indentations 66,68 may enable a user to place a fingertip or fingernail in contact with the extension elements 20,22 sufficiently to move the extension elements 20,22 out of the recesses 60,62 and toward the extended position.

With reference to FIGS. 9 and 10, each earpiece 16,18 may be pivotably connected to the lens frame 14 via a threaded pin or screw in a conventional manner. The extension elements 20,22 may be pivotably attached to the earpieces 16,18 via circular protrusions that matingly engage corresponding circular recesses in the earpieces 16,18.

In use, the eyewear 10 may be worn with the extension elements 20,22 in the retracted position until a need arises for the extension elements 20,22 to be deployed. By way of example, such a need may arise when the user leaves a building or is otherwise exposed to a higher level of ambient light, when the user enters an environment where dust or other debris is likely to come into contact with the user's face, or when the user desires to change the appearance of the eyewear 10. When the need arises, the user may simply remove the glasses from his or her head, move each of the extension elements 20,22 from the retracted position to the extended position, and then replace the glasses on his or her head. When there is no longer a need or desire for the extension elements 20,22 in the extended position, the user may simply repeat the process but move the extension elements 20,22 from the extended position to the retracted position. If only one extension element 20,22 is needed, the user may place one of the extension elements 20,22 in the retracted position and one in the extended position, such as in situations where the user is exposed to light from only one side.

Although the invention has been described with reference to an exemplary embodiment illustrated in the attached drawing figures, it is noted that equivalents may be employed and substitutions made herein without departing from the scope of the invention as recited in the claims. For example, the extension elements 20,22 may be of a different shape and size than depicted and described herein, and may be moveably attached to the earpieces in various location or positions, including to the outward-facing sides 26,30 of the earpieces 16,18. Furthermore, the recesses 60,62 may present a different configuration than that described herein, or may be omitted entirely.

Having thus described various embodiments of the invention, what is claimed as new and desired to be protected by Letters Patent includes the following:

1. Eyewear comprising:
    a lens frame;
    an earpiece attached to the lens frame; and
    an extension element movably attached to the earpiece and movable between a first position and a second position, wherein the extension element is pivotably attached proximate a bottom edge of the earpiece and is positioned below the earpiece when in the second position.

2. The eyewear of claim 1, wherein the extension element is pivotably attached to the earpiece and pivots between the first position and the second position.

3. The eyewear of claim 1, the earpiece including a recess for receiving the extension element in a nested relationship when the extension element is in the first position.

4. The eyewear of claim 3, the extension element being substantially flush with an inner surface of the earpiece adjacent the extension element when in the first position.

5. The eyewear of claim 3, the extension element being substantially flush with an outer surface of the earpiece adjacent the extension element when in the second position.

6. The eyewear of claim 3, wherein when in the extension element is in the second position, it is substantially flush with an outer surface of the earpiece adjacent the extension element and is substantially flush with an outer surface of the lens frame adjacent the extension element.

7. The eyewear of claim 3, wherein when the extension element is in the second position, a trailing edge of the extension element is in alignment with an edge of the earpiece proximate the extension element.

8. The eyewear of claim 1, the extension element being substantially adjacent both the earpiece and the lens frame when in the second position.

9. The eyewear of claim 1, the extension element engaging both the earpiece and the lens frame when in the second position.

10. The eyewear of claim 1, the earpiece being pivotably attached to the lens frame.

11. Eyewear comprising:
a lens frame;
an earpiece attached to the lens frame, the earpiece including a recess; and
an extension element pivotably attached to the earpiece and pivotable between a retracted position and an extended position, the extension element being nested in the recess and substantially flush with an inner surface of the earpiece when in the retracted position, the extension element being positioned at least partially below the earpiece and being substantially flush with an outer surface of the earpiece adjacent the extension element and with an outer surface of the lens frame adjacent the extension element when in the extended position.

12. The eyewear of claim 11, the earpiece further presenting an indent proximate the recess for facilitating access to the extension element.

13. The eyewear of claim 11, wherein when the extension element is in the extended position it is physically engaged with the earpiece and the lens frame.

14. The eyewear of claim 11, wherein a trailing edge of the extension element is in alignment with an edge of the earpiece proximate the extension element.

15. The eyewear of claim 11, the earpiece being pivotably attached to the lens frame.

16. A method of using eyewear comprising:
moving an extension element of an earpiece from a retracted position wherein the extension element is substantially hidden, to an extended position wherein the extension element is positioned below the earpiece; and
moving the extension element from the extended position to the retracted position.

17. The method of claim 16, further comprising moving the extension element from the retracted position to the extended position such that the extension element engages a portion of the earpiece and a portion of a lens frame.

18. The method of claim 16, wherein moving the extension element from the retracted position to the extended position includes the step of pivoting the extension element downward to the position below the earpiece.

\* \* \* \* \*